May 21, 1940.  M. FLEISCHER  2,201,649
ART OF MAKING MOTION PICTURE CARTOONS
Original Filed Dec. 5, 1936  5 Sheets-Sheet 1
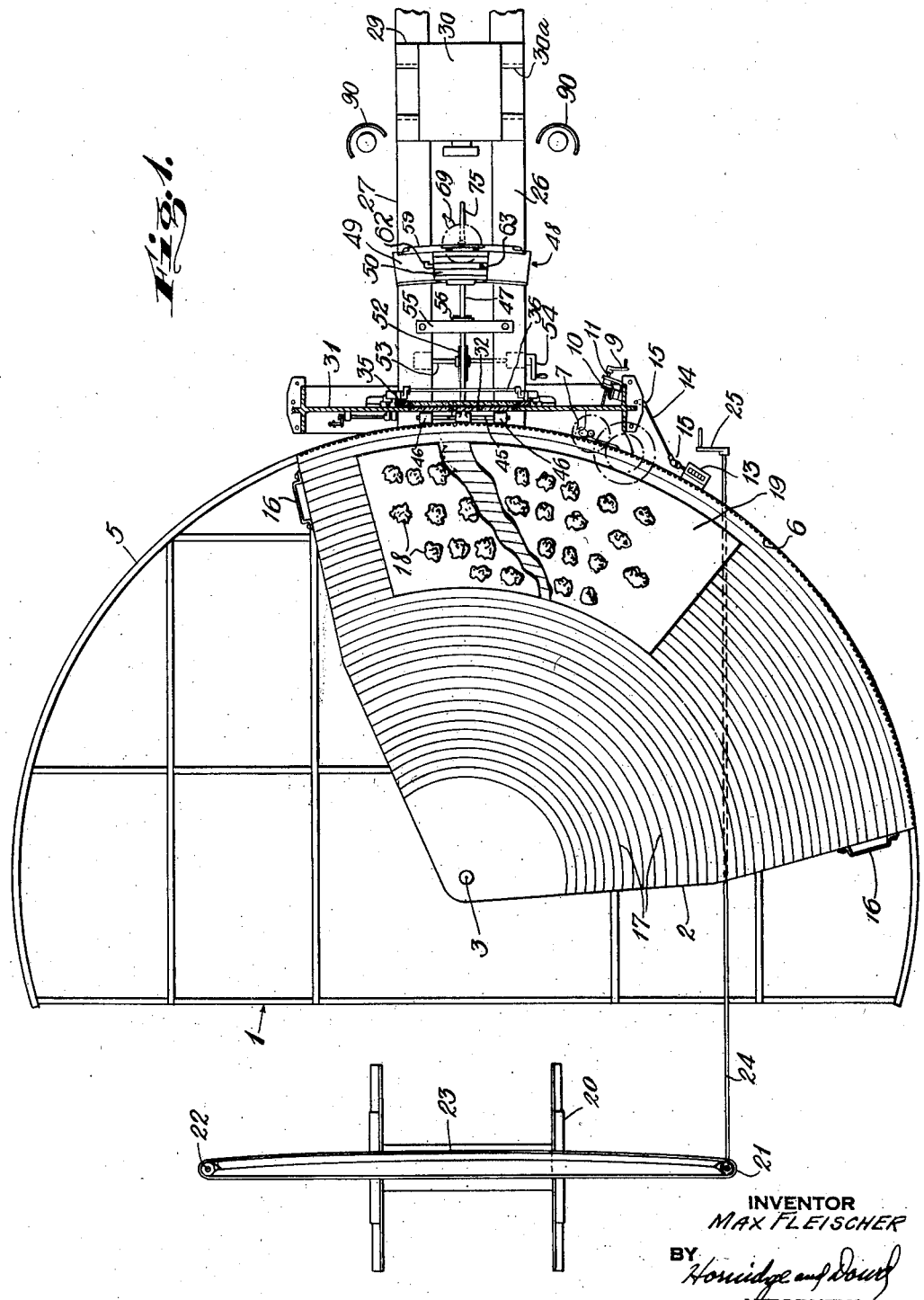
INVENTOR
MAX FLEISCHER
BY
ATTORNEYS May 21, 1940.                    M. FLEISCHER                    2,201,649
                    ART OF MAKING MOTION PICTURE CARTOONS
                Original Filed Dec. 5, 1936        5 Sheets—Sheet 2
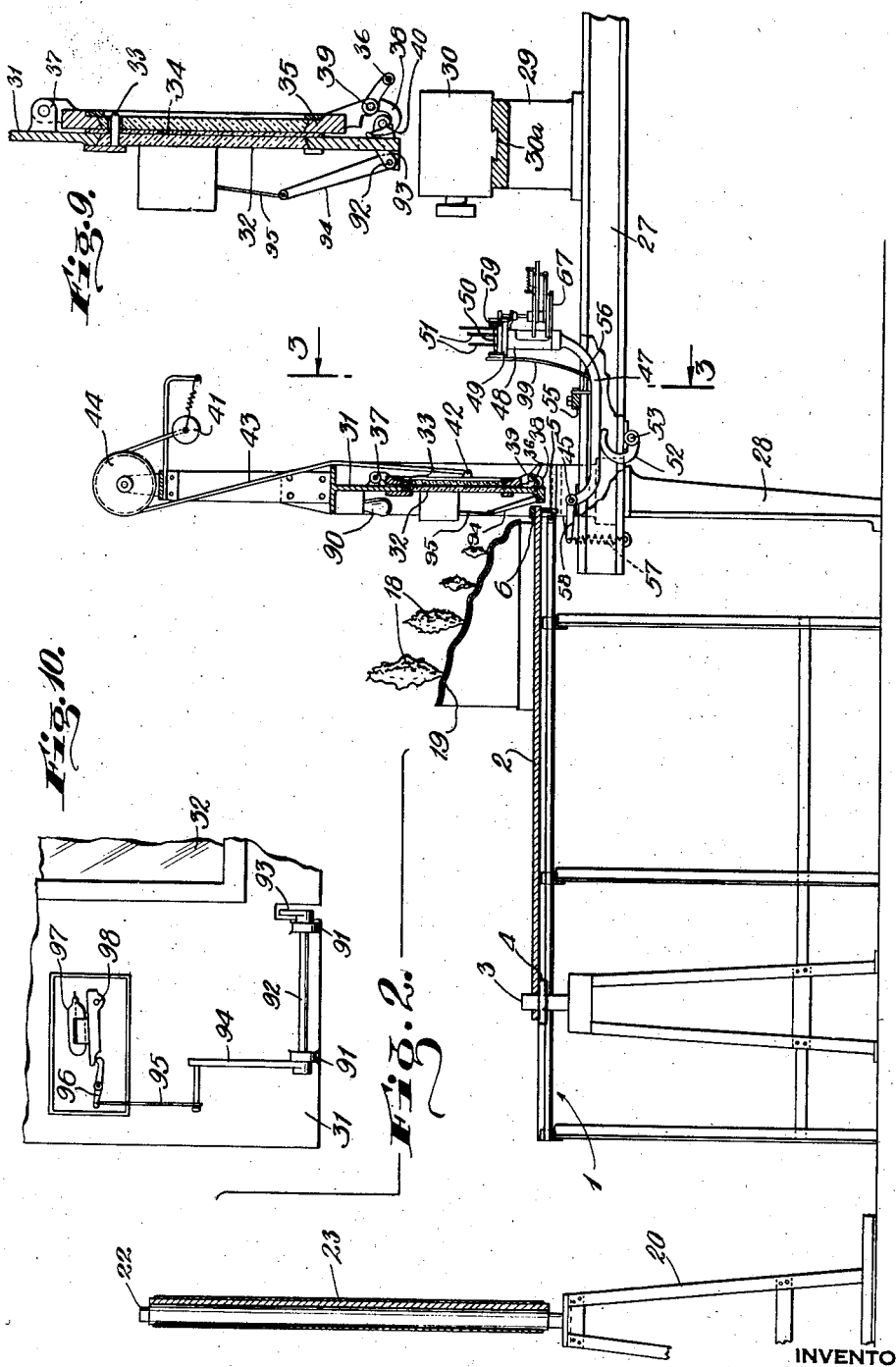
INVENTOR
MAX FLEISCHER
BY
Horridge and Dowd
ATTORNEYS

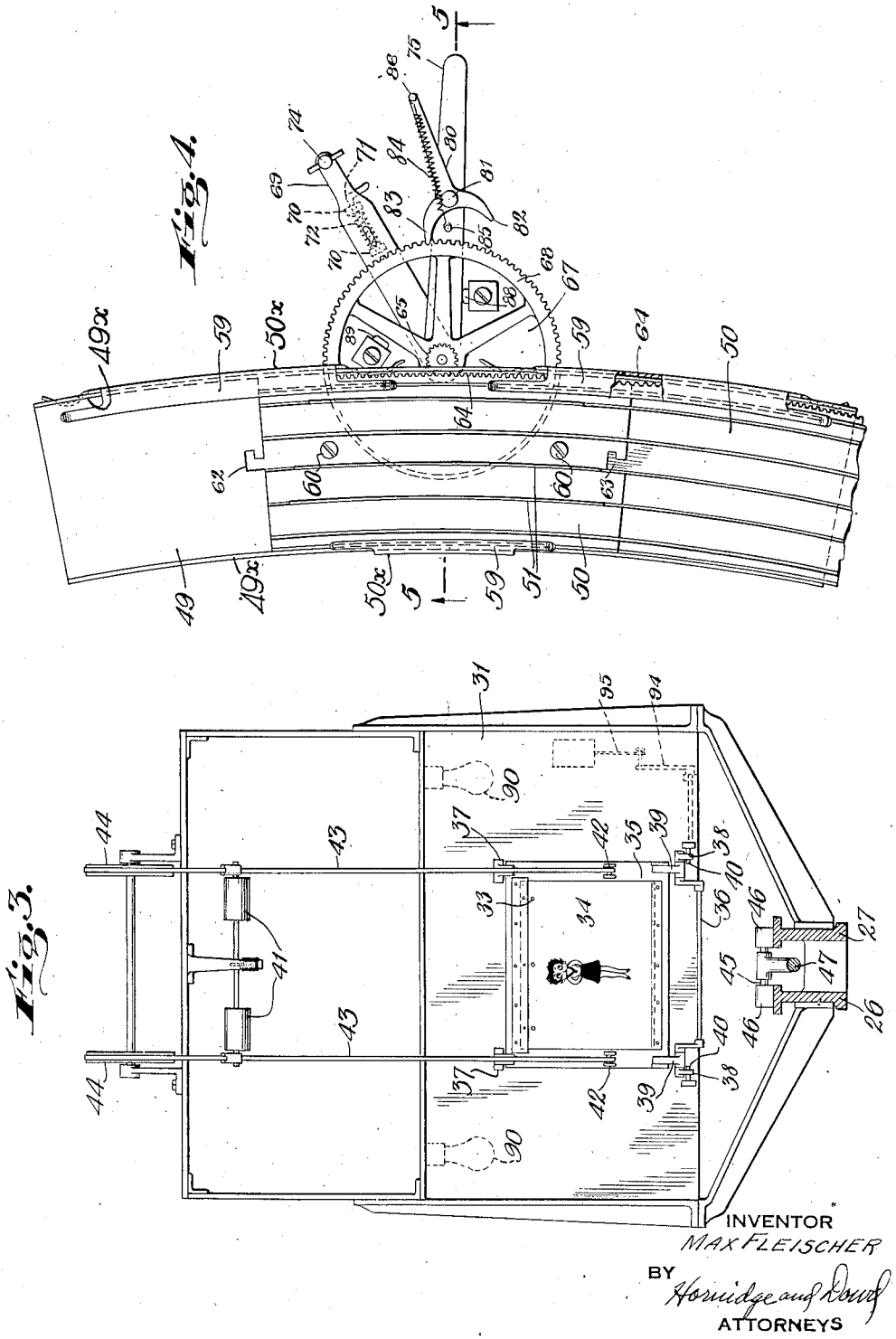

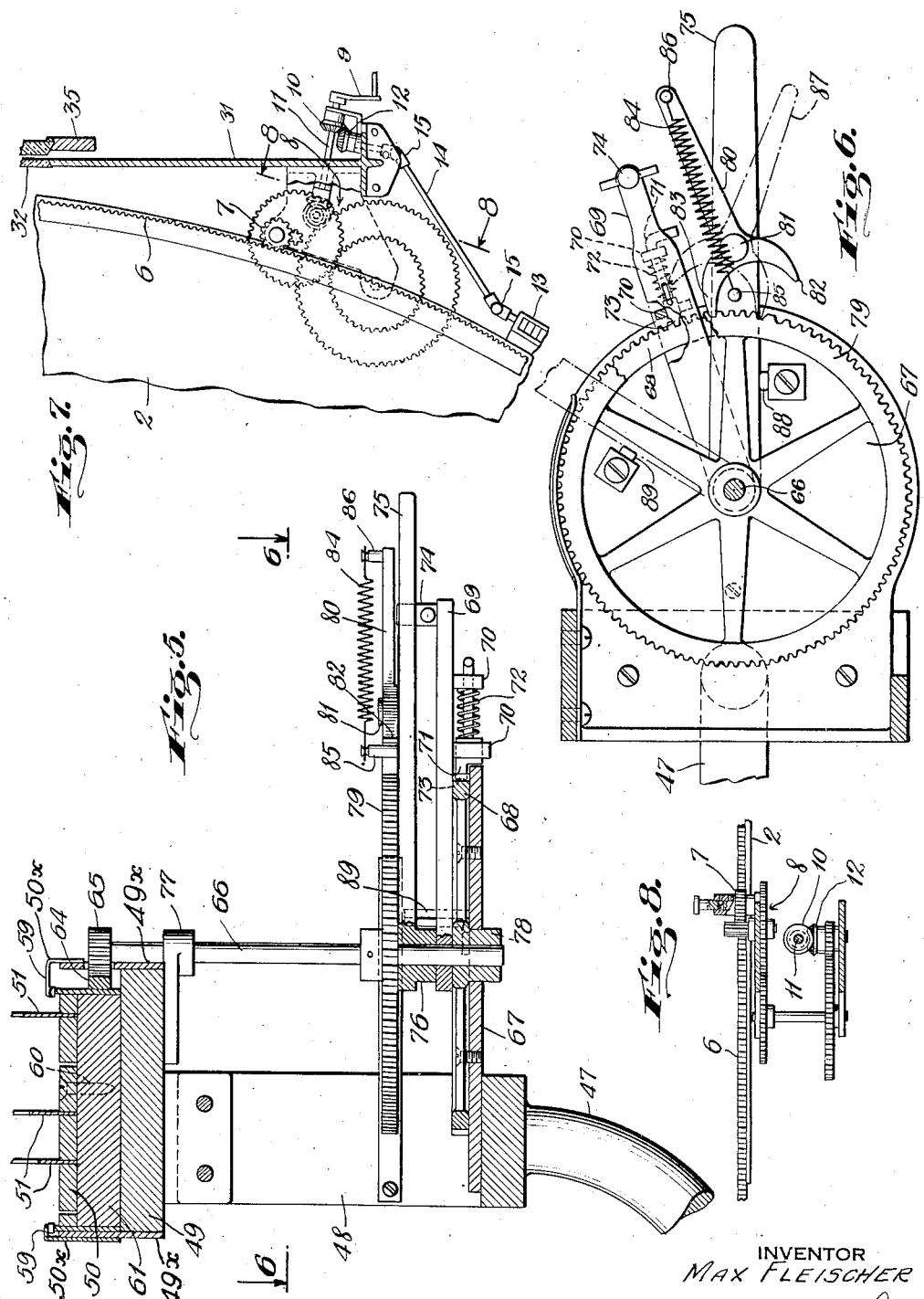

May 21, 1940.　　　　M. FLEISCHER　　　　2,201,649
ART OF MAKING MOTION PICTURE CARTOONS
Original Filed Dec. 5, 1936　　5 Sheets-Sheet 5
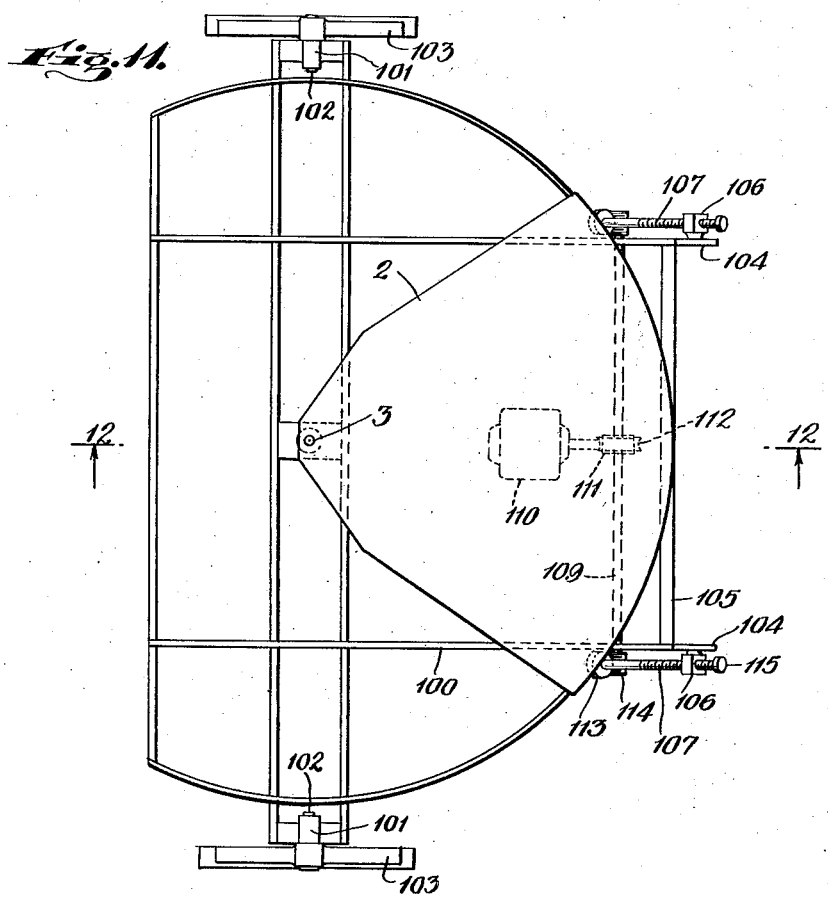
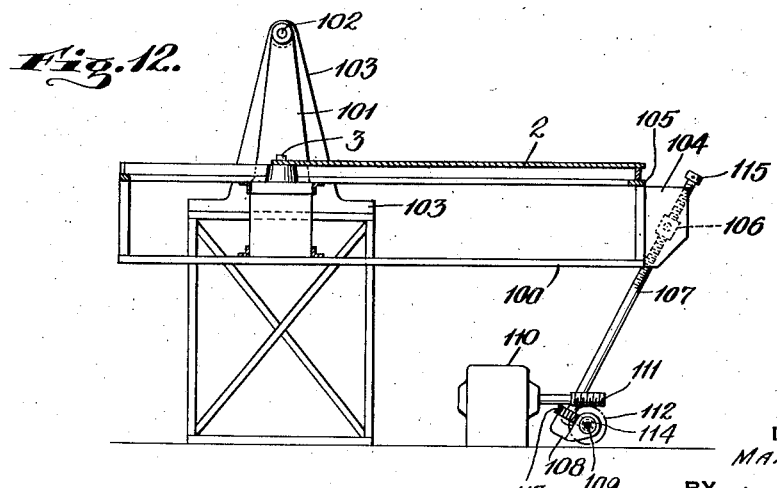
INVENTOR
MAX FLEISCHER
BY
Horuidge and Dowsy
ATTORNEYS Patented May 21, 1940

2,201,649

UNITED STATES PATENT OFFICE 2,201,649

ART OF MAKING MOTION PICTURE CARTOONS

Max Fleischer, Miami Beach, Fla.

Application December 5, 1936, Serial No. 114,295
Renewed October 12, 1939

21 Claims. (Cl. 88—16)

This invention relates to improvements in the art of making motion picture cartoons and is directed to a method and apparatus whereby the cartoon is made to appear more natural and realistic and constitutes, in part, many new and useful improvements in the method and apparatus of my Patent No. 2,054,414 granted September 15, 1936.

The term "motion picture cartoon" is employed in the broad sense and as including motion pictures of animated drawings or pictures of any description. These involve the production of a series of successive drawings or pictures depicting the object, whether animate or inanimate, in successive positions it occupies in the course of the picture as a whole. These pictures are photographed in succession upon the motion picture film and the subject of these drawings or pictures may be of any kind or description.

Heretofore, in the making of motion picture cartoons, the characters or objects which are to appear animated when the film is projected upon the screen, and which may be referred to as the foreground, are drawn on a transparent medium such as a Celluloid sheet or sheets while the objects constituting the background and which usually are not to appear animated are usually drawn upon a single sheet, although sometimes a background might be a composite of several sheets, those superimposed being transparent. The foreground sheet or sheets are superimposed upon the background sheet or sheets in close contact and the composite picture made up of these various layers of sheets is photographed. In using this method, however, the illusion of distance between the foreground and the background or between various component parts of the background depends upon the use of the known rules of perspective in drawing or painting the background, but this method does not give the observer a sense of true relative distance between the drawings or objects constituting the foreground and the various objects constituting the background, and notwithstanding the skill employed in making the drawings, the motion picture cartoons made by this method are characterized by an appearance of flatness and artificiality, which to a large degree, impairs their effectiveness.

When a scene which is composed of a foreground and a background consisting of various objects situated at different distances is to be depicted as from the viewpoint of an observer approaching or receding from the scene or moving across the scene, there is a continual change in the perspective relationship of the various objects composing the scene and it is impossible to secure in a motion picture cartoon such a changing perspective relationship between the various objects from the changing point of view of an observer by the use of prior methods except by making innumerable additional drawings, the cost of which would be prohibitive.

To overcome these defects and insufficiencies, I have devised a method and apparatus which involves setting up the various miniature scene objects constituting the background at various distances from the camera to constitute a background for an animated drawing on a transparent sheet or sheets interposed between them and the camera so that when the camera is moved towards or away from the scene to be photographed, the perspective relationship between the objects will be changed accordingly, thus producing in the finished cartoon the same effect of relative distances with respect to said objects as would be produced upon an observer moving towards or receding from the scene, and, in a similar way, by moving the said scene objects laterally in a horizontal plane at diminishing rates of progression in accordance with their relative distances from the camera, there is obtained in the finished cartoon the same changing perspective effect as an observer would get when moving across a scene where under natural circumstances more distant objects appear to move slowly by while the objects close to the observer move by with rapidity.

It is an object of my invention to accomplish the effects hereinbefore mentioned utilizing a series of animated cartoon drawings drawn on sheets of a transparent material such as Celluloid, which I will designate the foreground, and a number of miniature scene objects positioned at different distances from the camera, which I shall designate as the background, so as to create the appearance in a motion picture cartoon, of an animated character in front of some of said background objects and in back of others of them or moving progressively from one position to the other, and at the same time, preserving the changing perspective relationship between them resulting from what would be the changing position of an observer.

In accomplishing this method, I provide a frame for supporting a series of animated drawings constituting the foreground in line with a camera and behind said frame a platform substantially in the form of a segment of a circle adapted to move in a horizontal plane about a pivot upon which platform I have arranged the several miniature objects constituting the background at various distances radially of the pivot so that the platform as it swings about the pivot will carry the said background objects at different rates of progression across the field of the camera and thus give the proper changing perspective effect with respect to the objects from the point of view of an observer moving across the scene in accordance with their relative distances from the camera. Since the field of view of the camera increases with the distance from the camera of the objects to be photographed, it is apparent that in order to represent the animated figure of the drawing as located in front of some and behind others of the scene objects, as for instance, in front of the last row or so of the scene objects from the camera, and behind all the other scene objects which are closer to the camera, the size of the transparent sheet containing the drawing would have to be made considerably larger than it would if positioned closer to the camera so that the supporting frame will not appear in the photograph. This would require making the transparent sheets and their supporting frame so large as to be uneconomical and impracticable and consequently it is another object of my invention to provide a supplemental movable platform located between the camera and the supporting frame for the animated drawing upon which may be mounted and moved, at proper rates of progression relative to the rates of progression of the scene objects on the pivoted platform, various scene objects behind which the animated figure will appear in the finished cartoon, and by means of which the animated figure in a motion picture sequence may be made to appear as having moved from a position in front of a background scene object to a position behind it.

Another object of my invention is to provide a movable platform with means also for tilting it in a vertical plane whereby many additional novel effects and illusions can be created, such, for example, as though the observer were looking down upon or approaching the scene from a height.

Many other objects and effects will be apparent from the following detailed description of my invention with reference to the drawings, in which:

Fig. 1 is a plan view of a structure for carrying out my invention.

Fig. 2 is an elevation of same.

Fig. 3 is a view on the line 3—3 of Fig. 2.

Fig. 4 is a plan view of a supplementary movable platform constituting part of my invention.

Fig. 5 is a view on the line 5—5 of Fig. 4.

Fig. 6 is a view on the line 6—6 of Fig. 5.

Fig. 7 is an enlarged view of the means for operating the movable platform shown in Fig. 1.

Fig. 8 is a view on the line 8—8 of Fig. 7.

Fig. 9 is an enlarged cross sectional elevation of means for supporting the animated drawing.

Fig. 10 is a detail of the switching mechanism for operating an electric lamp.

Fig. 11 is a plan view of a platform adapted to swing in a vertical plane.

Fig. 12 is a sectional view on line 12—12 of Fig. 11.

1 is a supporting stand of steel frame construction having an open top located at a suitable height from the floor. A portion of the periphery of said top is arcuate in form to conform to the shape of the platform 2 positioned thereon and adapted to rotate in a horizontal plane about the pivot 3. This platform is preferably made in substantially the form of a segment of a circle out of a flat plate of steel or other metal of sufficient thickness to give it rigidity and forms a rotating platform to support a number of minature scene objects and carry them across the field of a camera positioned in front of them, the pivot about which said platform rotates being preferably in line with the optical axis of the camera. Said platform 2 is supported at its pivoted end by the collar 4 and at its arcuate edge by a metal band 5 attached to the said supporting stand about its arcuate periphery and extending slightly above the top, whereby the platform is supported slightly above and clear of the top of said supporting stand, the edge of said band 5 forming a rail upon which the platform may easily slide in its rotation about the pivot 3. The platform is formed along its circular edge with a toothed rack 6 engaging with the pinion 7 which is caused to rotate through a chain of gears 8 operated by the crank handle 9. The ratio of the said chain of gears is such that one turn of the crank handle causes the platform to rotate for but a very slight distance so that the apparent speed of the animated figure moving across the scene may be, if desired, at a slow rate of progress. By means of the bevel gear 10 attached to the crank shaft 11 and in mesh with the bevel gear 12 connected to a mechanical counting device 13 through the medium of the shaft 14 and the universal joints 15, an accurate record and check may be had upon the number of turns given to the crank handle and consequently the distance that the platform has been caused to travel thereby. Handles 16 on the outer radial edges of the platform enable the platform to be pulled around quickly to any position when so desired and to this end the pinion 7 may be moved out of mesh with rack 6, being slidable on its pivot with means for holding it in either direction.

Concentric scorings 17 on the surface of the platform 2 afford an easy and accurate gauge for positioning various scene objects on the platform at their desired relative distances from the camera. Said scorings, however, may be of sufficient depth to form slots in which cut-out cardboard pictorial representations of scenic objects may be inserted. I prefer, however, to form all of said miniature scene objects in their natural contours such as the trees 18 mounted upon a separate base 19 made, for instance, out of plastic material over a wire mesh and having an irregular continuous surface more closely representing a natural view of a scene. While with the use of such a segmental platform rotating about a pivot, a row of objects placed at the same distance radially of the pivot are thus caused to move tangentially of the plane of the camera instead of parallel thereto as would be the case with an observer moving across a natural scene, nevertheless, by making the radial distance of the scene objects from the pivot sufficiently long the movement of the background scene will not be perceived as circular when the finished film is projected but the said objects will appear to move in a straight line across the screen upon which the film is projected.

Behind the rotatable platform 2 and independently supported on the stand 20 are the vertical rollers 21 and 22 spaced apart a sufficient distance to be outside the field of the camera and carrying an endless belt 23 upon which may be depicted scenes to represent a distant background. By a pair of bevel gears attached to the roller 21 and the shaft 24 the operator by turning the crank 25 may cause the scenery depicted on the endless belt 23 to pass across the field of the camera at a much slower rate of progression than the scene objects on the platform 2, thus creating the illusion of great distance with respect to said scenery and at the same time maintaining a proper perspective relationship with the scene objects on the platform 2.

Associated with said rotatable platform and in front thereof is positioned a stand which is made preferably of steel and of heavy construction to form a support for the camera and others of the elements used in carrying out my invention. Said stand consists of two longitudinal side members 26 and 27 supported on legs such as 28.

Cross members are provided at the end of said side members to hold them in spaced parallel relation. Movably positioned between said side members and adapted to slide longitudinally thereon is the pedestal 29 which supports the motion picture camera 30. By means of a plate 30a of dovetailed cross section attached to the bottom of the camera and fitting in to a conforming slot in the top of the pedestal 29 the camera is held rigidly on the said pedestal except for a permissible sliding movement transversely of the said side members 26 and 27. Suitable means may be provided for locking said pedestal to the side members 26 and 27 and said camera to the pedestal in any desired position.

Rigidly mounted at one end of said stand is a vertically extending plate 31 in which there is inserted in line with the lens of the camera a glass window 32, over and along the top of which there are a number of projecting pins 33 to support a drawing 34 which is made on a Celluloid sheet having perforations therein to receive said pins. Supported on said plate behind the window 32 is a glass window frame 35. This window frame is provided with a bar handle 36 adjacent its lower edge whereby the same may be raised and lowered about the pivot 37 to give access to the said Celluloid sheet 34 when changing the same. Adjacent to said handle are a pair of hooks 38 pivoted in the brackets 39 and connected to the handle 36. By a downward pressure on the handle said hooks are adapted to engage pins 40 for locking or clamping the said window frame down on the said Celluloid sheet to securely hold the same between the glass in the window frame 35 and the glass window 32 in the plate 31. The inside edges of said hooks are so formed that after the hooks have engaged the pins 40 and the frame 35 has been brought into the required degree of pressure contact with the Celluloid sheet, further downward movement of the handle 36 and pivotal travel of the hooks 38 does not increase the said pressure but serves only to lock the said window frame securely and without danger of swinging outwardly under the downward pull of the weights 41 connected to the said frame at 42 by means of the cords 43 which pass over the pulleys 44. This is accomplished by making a portion of the inside edge of the hook beyond the pivot where it is adapted to effect the desired maximum pressure of the window frame 35 on the Celluloid drawing 34 in the form of the arc of a circle having for its center the pivot about which the hook swings.

Securely attached by a key or other suitable means to the shaft 45 which is journaled in the side members at 46 is a curved supporting arm 47, at the outer end of which is mounted on a bracket 48 attached thereto a guiding support 49 adapted to hold slidably thereon a supplemental platform 50 for miniature scene objects 51 so that the same may be mounted thereon and moved across the field of the camera. Also mounted on the outer end of said arm is the mechanism hereafter described for moving the said supplemental platform. A cam 52 securely attached to the shaft 53, which is journaled on the lower side of the side members 26 and 27 and operated by the crank handle 54, is adapted to engage with the underside of the supporting arm 47 and by turning said crank handle 54 the said arm and the guiding support with the supplemental platform 50 mounted thereon may be raised and lowered and held in a desired position in front of the camera or allowed to drop down between the said side members 26 and 27 out of the field of the camera with the arm resting on the collar of the cam attached to the shaft 53. A transverse bar 55 attached to the side members 26 and 27 carries a stop 56 to limit the upward travel of the said arm 47 and fix the supplemental platform 50 at its desired highest point in the field of the camera. The coil spring 57 attached to the extension 58 of the arm 47 serves to retard the sudden drop of the arm 47 when the cam moves out of engagement with the underside thereof. The supplemental platform 50 is curved along its length with its longitudinal edges forming arcs of circles having for their approximate center the pivot 3 so that the movement of said supplemental platform will be approximately parallel to that of the scene objects on the platform 2. Vertical guide members 49x for the supplemental platform 50 are secured to the longitudinal edges of the support 49, and to these guide members are secured additional vertical members 50x provided with flanges 59 to contact with the upper edges of the facing strips composed of brass or other metal with which the supplemental platform 50 is provided along its edges. The supplemental platform 50 is preferably composed of a metal plate secured by screws 60 to a wooden base 61. In the upper surface of the metal plate are longitudinal slots parallel to each other and to the direction of movement of said supplemental platform which slots are adapted to receive and hold in an upright position cut out pictures of scene objects such as 51 to form a portion of the scenic components of a cartoon. For convenience said supplemental platform is made in sections attachable end to end by means of the flat hook extension 62 at the end of one section fitting into a corresponding cut out portion at the adjacent end of the adjacent section as at 63. Said platform is provided along one edge with a toothed rack 64 in mesh with the pinion 65 attached to the upper end of the vertical shaft 66 so that by the rotation of said shaft, said platform is driven across the field of the camera. A plate 67 carried by the supporting arm 47 serves to support the operating mechanism for driving said platform 50. Attached to this plate by screws and concentric with the shaft 66 is a fixed disk or wheel 68 provided with teeth along its periphery. Pivoted on the vertical shaft 66 directly above said toothed disk and free to rotate on said shaft is the arm 69.

Slidably mounted in brackets 70 attached to the underside of the arm 69 is the pin 71 actuated by the spring 72. Said pin is bent at one end to form a handle and is provided at its other end with the detent 73 adapted to engage with the teeth of the disc or wheel 68. In the outer end of the arm 69 is fixed a vertical pin 74 extending up to the level of the upper surface of the lever 75. Said lever 75 is provided at one end with a collar 76 rotatably mounted on the shaft 66 which is journaled in the bearings 77 and 78. A gear 79 is rigidly attached to said shaft directly above the collar 76. A double acting pawl 80 is pivoted on the vertical stud 81 attached to the lever 75 and is adapted at one end to engage the teeth of the gear 79. At the end adjacent the gear 79 said pawl is formed with two spaced apart detents 82 and 83 each of which is adapted to engage the teeth of said gear 79. A coil spring 84 held in tension by the pin 85 positioned on the lever 75 between the said two detents and the pin 86 on the other end of the pawl serves to maintain either one of said detents selectively in engagement with the gear 79. It will be observed that with the pawl in the position shown by the solid lines in Fig. 6, a movement of the lever 75 in a direction away from the arm 69 will result in the detent 83 riding upon the teeth of the gear 79 while a movement of said lever in the opposite direction will cause the gear 79 to be rotated in the direction of the movement of said lever, the spring 84 tending to hold the detent 83 in engagement between two of the teeth on the gear 79. When the pawl is thrown to the position shown in the broken lines and indicated by the numeral 87 the reverse results will follow. A fixed stop 88 fastened to the plate 67 by a screw will limit the extent of movement of the lever 75 in one direction and the pin 74 at the end of the adjustable arm 69 will fix the extent of its movement in the other direction. Thus with each to and fro movement of the lever 75 for the distance between the pin 74 and the stop 88, the gear 79 will be rotated the same prescribed distance in one direction, effecting a corresponding movement of the supplemental platform across the field of the camera 30. Another fixed stop 89 also fastened to the plate 67 by a screw serves to limit the movement of the adjustable arm 69 and the pin 74 fixed therein.

Electric lamps 90 are provided for illuminating the scene objects on the platform 2 and the supplemental platform 50 as well as the cartoon drawing in the window 32. The light from these lamps must be of sufficient strength for photographing without undue length of exposure the drawing and the various scene objects and since such light is not needed while the drawings are being changed I have provided a novel arrangement of switching means whereby the lighting circuit is closed when the window frame 35 is locked in a closed position by the hooks 38 and is broken when the said window frame is unlocked.

Journaled in the brackets 91 attached to the outer face of the vertical plate 31 adjacent the lower edge of the window 32 and to one side thereof, is a shaft 92 one end of which carries the arm 93 extending through said plate and engaging with the end of one of the hooks 38. The other end of said shaft is provided with the crank 94 which is connected by the link 95 to one end of a rocker arm 96. The other end of said rocker arm engages a tiltable mercury switch. Said rocker arm and mercury switch are housed in a receptacle mounted on the plate 31 above the shaft 92. Said switch is of well known construction comprising a horizontal glass tube 97 containing mercury and two electrodes extending into it, and by tilting the tube the mercury will flow toward or away from the electrodes. When the window frame is locked in its closed position the end of one of the hooks 38 presses against the arm 93 thus rotating the shaft 92 causing the crank 94 to descend and by means of the link 95 and the rocker arm 96 the mercury switch is lifted about the pivot 98, which causes the mercury to flow to the end of the switch tube containing the electrodes and establishes an electrical connection between them, thus lighting the lamps. When the window frame 35 is opened and the pressure of said hook against the arm 93 is released the end of the mercury switch in contact with the rocker arm descends by gravity causing the mercury to flow away from the electrodes thus breaking the electrical connection between them and extinguishing the lamps.

A curtain 99 of black cloth or other light absorbing material is suspended from the outer edge of the support 49 and hangs down over and between the side members 26 and 27 to prevent light falling upon any part of the supporting arm 47, bracket 48 or driving mechanism for the supplemental platform 50 being reflected by the glass window frame 32 into the lens of the camera.

In Figs. 11 and 12, I have shown means for carrying out my invention in respect to a motion picture cartoon wherein an animated figure is made to appear as moving across a background but upon a plane above it or as moving obliquely down towards or upwards and away from the background from or to a height above it or as having both movements, and at the same time preserving the continually changing perspective relationship between the scenic objects constituting the background. Instead of the pivoted platform 2 being confined to movement in a horizontal plane, I have shown in Figs. 11 and 12 an arrangement of said platform and its supporting means whereby the platform may be given either a pivotal motion in a horizontal plane or a pivotal motion in a vertical plane, or the resultant combination of both movements, and in such a way that the various scene objects on said platform will move across the field of the camera at relatively slower rates of progression in accordance with their longitudinal distances from the camera. In this arrangement, I utilize the same pivoted segmental platform and the means for supporting and driving it as hereinbefore described except that the supporting frame 100 does not extend to the floor but is provided at its opposite sides in line with the pivot 3 the upright members 101 extending a substantial distance above the platform 2. Fixed in the upper ends of said upright members 101 are the trunnions 102 which are journaled in bearings in the upper end of the vertical supports 103 which rest upon the floor. The said platform is positioned at a suitable height relative to the axis of the camera so that as the platform swings in a vertical plane, a satisfactory view of the scene objects thereon will be presented to the camera. Said supporting frame 100 is provided at its side towards the camera with the outwardly extending vertical spaced-apart plates 104 which are joined by the bar 105. Rotatably mounted on the outside of said plates are internally threaded blocks 106 in each of which is threaded a shaft 107 which extends obliquely down to a point under said supporting frame where it is journaled in a bearing 108 rigidly connected to the journal of the longitudinal shaft 109. Adjacent its lower end said shaft 107 is equipped with a spiral gear 113 cooperating with a spiral gear 114 on the adjacent end of the longitudinal shaft 109. By means of the electric motor 110 carrying on the end of its armature shaft a worm 111 engaging with a gear 112 on the shaft 109, said shaft 109 may be caused to rotate, thus rotating the threaded shafts 107 which by engagement with the threaded blocks 106 will cause the supporting frame 100 and the platform 2 supported thereon to rotate in a vertical plane on the bearings in the upper ends of the vertical supports 103. Where the desired pivotal movement in a vertical plane is of slight extent the spiral gears 113 and 114 by suitable means may be thrown out of mesh with each other and the threaded shafts 107 may be rotated by hand, using the knobs 115 attached to their upper ends, the number of turns given to the shafts being an exact measure of the distance which the platform may be caused to rise or fall.

It will be observed that the supplemental platform 50 is also adapted for movement in a vertical plane on the shaft 45 so that the scene objects on said supplemental platform may be moved up and down in the field of the camera in step with the scene objects on the platform 2.

In practicing my invention, to depict, for instance, an animated figure traveling across the background in different vertical planes with respect to the scene objects comprising the background, I first photograph one by one a series of drawings showing the figure in progressive stages of animation, such as walking, the drawings being placed in the window 32 and the background scene objects on the platform 2, and between exposures, I rotate the platform 2 a definite distance in accordance with the predetermined speed of travel of the animated figure. To depict the figure as continuing said travel across said background but in a vertical plane behind some of the scene objects on the platform 2, I make replicas on a reduced scale of those of the scene objects on the platform 2 behind which the figure is to appear and position said reduced replicas on the supplemental platform 50. The size of said replicas must be such that in view of their distance from the lens of the camera they will produce the same size images on the sensitive film in the camera as were produced by the said scene objects on the platform 2. The said scene objects behind which the animated figure is to appear may be then removed from the platform 2, although I have found that where the replicas are carefully made with respect to their size and positioned on the supplemental platform, there will be a complete registry in the field of the camera between said replicas and the scene objects which they represent so that only the images of their replicas will appear on the film in the camera and as though located at the same distance from the camera as the said scene objects which they represent so that it is unnecessary to remove such scene objects from the platform 2. I then continue photographing the drawings of the animated figure seriatim with the scene objects on the platform 2 and the said replicas on the supplemental platform 50 and between exposures rotate the platform 2 a predetermined distance as before, while at the same time, the supplemental platform 50 carrying the replicas is moved in the same direction a distance sufficient to cause the images of the replicas to occupy the same position on the sensitive film in the camera that images of the scene objects on the platform which the replicas represent would occupy had the objects not been removed or the replicas interposed between them and the camera; in other words each replica will be in registry with its respective scene objects before its removal or will cover it if it has not been removed. The extent of said reduction in size required in making said replicas and the extent of said movement of the supplemental platform 50 are matters of computation depending on the comparative distances of said scene objects and their replicas from the camera and well known to those skilled in the art.

It will be observed that the proper changing perspective effect between the various scene objects will be preserved both before and after some of the said scene objects have been transferred in reduced size from the platform 2 to the supplemenal platform 50, the same as though there had been no such transfer.

In a similar way I may depict the animated figure as progressing from the front to the rear of the background by transferring to the supplemental platform 50, in the form of reduced replicas, the scene objects on the platform 2 as the animated figure is to appear as having passed beyond their respective planes in its progress towards the rear. In depicting the animated figure as proceeding towards the front, this procedure is reversed.

Again, I may make an entire sequence with the animated figure represented as substantially in the same vertical plane behind some of the background scene objects and in front of others in which case there is no need of making replicas of any of the scene objects but those portions of the scene objects behind which the animated figure is to appear are positioned on the supplemental platform and are relatively of a much smaller size than the others on the platform 2.

To depict the animated figure as traveling across the scene in front of said scene objects at different levels with respect thereto, as for instance, in the form of progress by extravagantly high leaps, the platform 2 between exposures is moved also in a vertical plane by means of an arrangement such as shown in Figs. 11 and 12 a suitable distance to conform with such movement of the animated figure. In this way, the proper perspective relationship between the scene objects on the platform from the viewpoint of an observer on a level with the animated figure is likewise preserved due to the relatively slower rates of progression in the vertical plane, as well as in the horizontal plane, of the scene objects in accordance with their relative distances from the camera. Thus also may be depicted the flight of a bird or aeroplane downwardly toward the scene from the point of view of a following observer and at the same time preserving the changing perspective relationship between the scene objects by raising the platform 2 from a downwardly oblique position a given distance between the exposures to a horizontal position and also between exposures moving the camera a given distance towards the platform.

It is to be understood that the foregoing instances are merely exemplary and not in limitation of my invention and that various changes may be made without departing from the invention as defined in the appended claims.

What I claim is:

1. In motion picture cartoon photography, the combination with a camera of a frame disposed in front of said camera for supporting one or more cartoon drawings, a plurality of miniature scene objects spaced apart linearly of the camera behind said frame in the field of the camera, means including a platform pivoted on both vertical and horizontal axes for supporting and maintaining said objects in such spaced relationship and for moving the same in both a horizonal and vertical direction across the field of the camera at different rates of progression, a plurality of other miniature scene objects spaced apart linearly of the camera in front of said frame in the field of the camera and means including a slidable platform for supporting and maintaining said last mentioned scene objects in such spaced relationship and for moving the same laterally in the same direction across the field of the camera at different rates of progression and independently of said first mentioned miniature scene objects.

2. The method of producing motion picture cartoons, which includes positioning one of a series of cartoon drawings in front of a plurality of miniature scene objects disposed in spaced relation, one behind the other, positioning a camera forwardly of and directed toward said drawing and said objects, making a photographic exposure with said camera, changing the drawing and at the same time positioning a replica on a reduced scale of one of said miniature scene objects between said camera and said cartoon drawing, moving said miniature scene objects and said replica laterally in the same direction at different rates of progression to give a different perspective effect, with said replica covering said scene object in the view of the camera, and making another photographic exposure with said camera.

3. The method of producing motion picture cartoons, which includes positioning one of a series of cartoon drawings in front of a plurality of miniature scene objects disposed in spaced relation, one behind the other, positioning a camera forwardly of and directed toward said drawing and said objects, making a photographic exposure with said camera, positioning a replica on a reduced scale of one of said miniature scene objects between said camera and said cartoon drawing, moving said miniature scene objects and said replica laterally in the same direction at different rates of progression to give a different perspective effect, with said replica covering said scene object in the view of the camera, and making another photographic exposure with said camera.

4. The method of producing motion picture cartoons, which includes positioning one of a series of cartoon drawings in front of a plurality of miniature scene objects disposed in spaced relation, one behind the other, positioning a camera forwardly of and directed toward said drawing and said objects, making a photographic exposure with said camera, changing the drawing and at the same time positioning a replica on a reduced scale of one of said miniature scene objects between said camera and said cartoon drawing, with said replica covering said scene object in the view of the camera, and making another photographic exposure with said camera.

5. The method of producing motion picture cartoons, which includes positioning one of a series of cartoon drawings in front of a plurality of miniature scene objects disposed in spaced relation one behind the other, positioning a camera forwardly of and directed toward said drawing and said objects, making a photographic exposure with said camera, changing the drawing and at the same time positioning a replica on a reduced scale of one of said miniature scene objects between said camera and said cartoon drawing, said replica being of such size and so positioned that as viewed by the camera it will be in registry with said scene object, moving said miniature scene objects and said replica laterally in the same direction at different rates of progression to give a different perspective effect, with said replica covering said scene object in the view of the camera, and making another photographic exposure with said camera.

6. The method of producing motion picture cartoons, which includes positioning one of a series of cartoon drawings in front of a plurality of miniature scene objects disposed in spaced relation one behind the other, positioning a camera forwardly of and directed toward said drawing and said objects, making a photographic exposure with said camera, positioning a replica on a reduced scale of one of said miniature scene objects between said camera and said cartoon drawing, said replica being of such size and so positioned that as viewed by the camera it will be in registry with said scene object, moving said minature scene objects and said replica laterally in the same direction at different rates of progression to give a different perspective effect, with said replica covering said scene object in the view of the camera, and making another photographic exposure with said camera.

7. The method of producing motion picture cartoons, which includes positioning one of a series of cartoon drawings in front of a plurality of miniature scene objects disposed in spaced relation one behind the other, positioning a camera forwardly of and directed toward said drawing and said objects, making a photographic exposure with said camera, changing the drawing and at the same time positioning a replica on a reduced scale of one of said miniature scene objects between said camera and said cartoon drawing, said replica being of such size and so positioned that as viewed by the camera it will be in registry with said scene object, and making another photographic exposure with said camera.

8. The method of producing motion picture cartoons, which includes positioning one of a series of cartoon drawings in front of a plurality of miniature scene objects disposed in spaced relation, one behind the other, positioning a camera forwardly of and directed towards said drawing and said objects, making a photographic exposure with said camera, changing the drawing and at the same time physically substituting for one of said miniature scene objects a replica thereof on a reduced scale and positioning said replica between said camera and said cartoon drawing, said replica being of such size and so positioned as to be in registry with said scene object before it was removed, moving said replica and the remainder of said miniature scene objects laterally in the same direction at different rates of progression to give a different perspective effect, and making another photographic exposure with said camera.

9. The method of producing motion picture cartoons, which includes positioning one of a series of cartoon drawings in front of a plurality of miniature scene objects disposed in spaced relation, one behind the other, positioning a camera forwardly of and directed towards said drawing and said objects, making a photographic exposure with said camera, physically substituting for one of said miniature scene objects a replica thereof on a reduced scale and positioning said replica between said camera and said cartoon drawing, said replica being of such size and so positioned as to be in registry with said scene object before it was removed, moving said replica and the remainder of said miniature scene objects laterally in the same direction at different rates of progression to give a different perspective effect, and making another photographic exposure with said camera.

10. The method of producing motion picture cartoons, which includes positioning one of a series of cartoon drawings in front of a plurality of miniature scene objects disposed in spaced relation, one behind the other, positioning a camera forwardly of and directed towards said drawing and said objects, making a photographic exposure with said camera, changing the drawing and at the same time physically substituting for one of said miniature scene objects a replica thereof on a reduced scale and positioning said replica between said camera and said cartoon drawing, said replica being of such size and so positioned as to be in registry with said scene object before it was removed, and making another photographic exposure with said camera.

11. The method of making motion picture cartoons, which includes successively photographing a series of cartoon drawings placed one at a time in the field of the camera and a plurality of miniature scene objects spaced apart linearly of the camera, changing the carton drawings between two exposures during the photography, positioning between two exposures a replica on a reduced scale of one of said miniature scene objects disposed on the opposite side of said cartoon drawing from said camera, between said camera and said cartoon drawing, said replica being of such size and so positioned that as viewed by the camera it will be in registry with said scene object, and, between two exposures, moving said replica and said miniature scene objects laterally in the same direction at different rates of progression to give a different perspective effect, with said replica covernig said scene object in the view of the camera.

12. The method of making motion picture cartoons, which includes successively photographing a series of cartoon drawings placed one at a time in the field of the camera and a plurality of miniature scene objects spaced apart linearly of the camera, positioning between two exposures a replica on a reduced scale of one of said miniature scene objects disposed on the opposite side of said cartoon drawing from said camera, between said camera and said cartoon drawing, said replica being of such size and so positioned that as viewed by the camera it will be in registry with said scene object, and, between two exposures, moving said replica and said miniature scene objects laterally in the same direction at different rates of progression to give a different perspective effect, with said replica covering said scene object in the view of the camera.

13. The method of making motion picture cartoons, which includes successively photographing a series of cartoon drawings placed one at a time in the field of the camera and a plurality of miniature scene objects spaced apart linearly of the camera, changing the cartoon drawings between two exposures during the photography, positioning between two exposures a replica on a reduced scale of one of said miniature scene objects disposed on the opposite side of said cartoon drawing from said camera, between said camera and said cartoon drawing, said replica being of such size and so positioned that as viewed by the camera it will be in registry with said scene object, and, between two exposures, moving said replica and said miniature scene objects laterally in the same direction at different rates of progression to give a different perspective effect, with said replica covering said scene object in the view of the camera.

14. The method of producing motion picture cartoons, which includes positioning one of a series of cartoon drawings behind a plurality of miniature scene objects disposed in spaced relation, one behind the other, positioning a camera forwardly of and directed towards said objects and said drawing, making a photographic exposure with said camera, changing the drawing and at the same time physically substituting for one of said miniature scene objects a replica thereof on an enlarged scale and positioning said replica behind said cartoon drawing, said replica being of such size and so positioned as to be in registry with said scene object prior to removal thereof, moving said replica and the remainder of said miniature scene objects laterally in the same direction at different rates of progression to give a different perspective effect, and making another photographic exposure with said camera.

15. The method of producing motion picture cartoons, which includer positioning one of a series of cartoon drawings behind a plurality of miniature scene objects disposed in spaced relation, one behind the other, positioning a camera forwardly of and directed towards said objects and said drawing, making a photographic exposure with said camera, physicallly substituting for one of said miniature scene objects, a replica thereof on an enlarged scale and positioning said replica behind said cartoon drawing, said replica being of such size and so positioned as to be in registry with said scene object prior to removal thereof, moving said replica and the remainder of said miniature scene objects laterally in the same direction at different rates of progression to give a different perspective effect, and making another photographic exposure with said camera.

16. The method of producing motion picture cartoons, which includes positioning one of a series of cartoon drawings behind a plurality of miniature scene objects disposed in spaced relation, one behind the other, positioning a camera forwardly of and directed towards said objects and said drawing, making a photographic exposure with said camera, changing the drawing and at the same time physically substituting for one of said miniature scene objects a replica thereof on an enlarged scale and positioning said replica behind said cartoon drawing, said replica being of such size and so positioned as to be in registry with said scene object prior to removal thereof, and making another photographic exposure with said camera.

17. The method of producing motion picture cartoons which includes positioning one of a series of cartoon drawings behind some and in front of others of a plurality of miniature scene objects disposed in spaced relation, one behind the other, positioning a camera forwardly of and directed towards said objects and said drawing, making a photographic exposure with said camera, changing the drawing and at the same time physically substituting for one of said miniature scene objects a replica thereof on a different scale and positioning said replica on the side of said cartoon drawing opposite to that on which said scene object was positioned prior to removal thereof, said replica being of such size and so positioned as to be in registry with said scene object prior to removal thereof, moving said replica and the remainder of said miniature scene objects at different rates of progression to give a different perspective effect, and making another photographic exposure with said camera.

18. The method of producing motion picture cartoons which includes positioning one of a series of cartoon drawings behind some and in front of others of a plurality of miniature scene objects disposed in spaced relation, one behind the other, positioning a camera forwardly of and directed towards said objects and said drawing, making a photographic exposure with said camera, physically substituting for one of said miniature scene objects a replica thereon on a different scale and positioning said replica on the side of said cartoon drawing opposite to that on which said scene object was positioned prior to removal thereof, said replica being of such size and so positioned as to be in registry with said scene object prior to removal thereof, moving said replica and the remainder of said miniature scene objects laterally in the same direction at different rates of progression to give a different perspective effect, and making another photographic exposure with said camera.

19. The method of producing motion picture cartoons which includes positioning one of a series of cartoon drawings behind some and in front of others of a plurality of miniature scene objects disposed in spaced relation, one behind the other, positioning a camera forwardly of and directed towards said objects and said drawing, making a photographic exposure with said camera, changing the drawing and at the same time physically substituting for one of said miniature scene objects a replica thereof on a different scale, and positioning said replica on the side of said cartoon drawing opposite to that on which said scene object was positioned prior to removal thereof, said replica being of such size and so positioned as to be in registry with said scene object prior to removal thereof, and making another photographic exposure with said camera.

20. In motion picture cartoon photography, the combination with a camera of a frame disposed in front of said camera for supporting one or more cartoon drawings, a plurality of miniature scene objects spaced apart linearly of the camera behind said frame in the field of the camera, means including a platform pivoted on both vertical and horizontal axes for supporting and maintaining said objects in such spaced relationship and for moving the same in both a horizontal and vertical direction across the field of the camera at different rates of progression, a plurality of other miniature scene objects spaced apart linearly of the camera in front of said frame in the field of the camera and means including an arm pivotatlly mounted on a horizontal axis and a slidable platform mounted on said arm for supporting and maintaining said last mentioned scene objects in such spaced relationship and for moving the same in both a horizontal and vertical direction across the field of the camera at different rates of progression and independently of said first mentioned miniature scene objects.

21. In motion picture cartoon photography, the combination with a camera of a frame disposed in front of said camera for supporting one or more cartoon drawings, a plurality of miniature scene objects spaced apart linearly of the camera behind said frame in the field of the camera, means including a platform pivoted on a vertical axis for supporting and maintaining said objects in such spaced relationship and for moving the same in a horizontal direction across the field of the camera at different rates of progression, a plurality of other miniature scene objects spaced apart linearly of the camera in front of said frame in the field of the camera and means including an arm pivotally mounted on a horizontal axis and a slidable platform mounted on said arm for supporting and maintaining said last mentioned scene objects in such spaced relationship and for moving the same in both a horizontal and vertical direction across the field of the camera at different rates of progression and independently of said first mentioned miniature scene objects.

MAX FLEISCHER.